United States Patent [19]

Andersson et al.

[11] 4,350,667

[45] Sep. 21, 1982

[54] EXTRACTION OF COPPER FROM AN AMMONIACAL COPPER SOLUTION

[75] Inventors: Sven O. S. Andersson, Kållered; Harald D. Ottertun, Mölndal; Hans Reinhardt, Västra Frölunda, all of Sweden

[73] Assignee: MX-Processor Reinhardt & Co AB, Sweden

[21] Appl. No.: 236,562

[22] Filed: Feb. 20, 1981

[30] Foreign Application Priority Data

Mar. 18, 1980 [SE] Sweden .............................. 8002119

[51] Int. Cl.$^3$ ................................................ C01G 3/00
[52] U.S. Cl. ........................................ 423/24; 252/182
[58] Field of Search .................... 423/24, DIG. 14; 75/101 BE; 156/642

[56] References Cited

U.S. PATENT DOCUMENTS

| | | | |
|---|---|---|---|
| 3,988,151 | 10/1976 | Skarbo | 423/24 |
| 4,083,758 | 4/1978 | Hamby | 204/106 |
| 4,100,163 | 7/1978 | Virnig | 423/24 |
| 4,128,493 | 12/1978 | MacKay | 252/182 |
| 4,173,616 | 11/1979 | Koenders | 423/24 |
| 4,175,012 | 11/1979 | MacKay | 423/24 |
| 4,205,048 | 5/1980 | Kyung | 423/24 |
| 4,252,621 | 2/1981 | Reinhardt | 423/24 |
| 4,258,016 | 3/1981 | Siemens | 423/24 |

FOREIGN PATENT DOCUMENTS

| | | | |
|---|---|---|---|
| 1062474 | 9/1979 | Canada | 423/24 |
| 2451006 | 4/1976 | Fed. Rep. of Germany | 423/24 |

OTHER PUBLICATIONS

Flett et al., *Hydrometallurgy*, vol. 4, (1979), pp. 135–146.

Primary Examiner—Brian E. Hearn
Attorney, Agent, or Firm—Burns, Doane, Swecker & Mathis

[57] ABSTRACT

Copper can be extracted from an ammoniacal copper solution by contacting said solution with an organic phase containing a first extraction reagent consisting of a beta-diketone as well as a second extraction reagent consisting of a hydroxy oxime, a hydroxy quinoline, or an alkylaryl sulphonamido quinoline. Alternatively, the copper solution can first be contacted with an organic phase containing the first extraction agent, and subsequently be contacted with an organic phase containing the second extraction reagent. It is possible to reach a low percentage of copper in the aqueous solution by using a low number of extraction steps.

3 Claims, 4 Drawing Figures

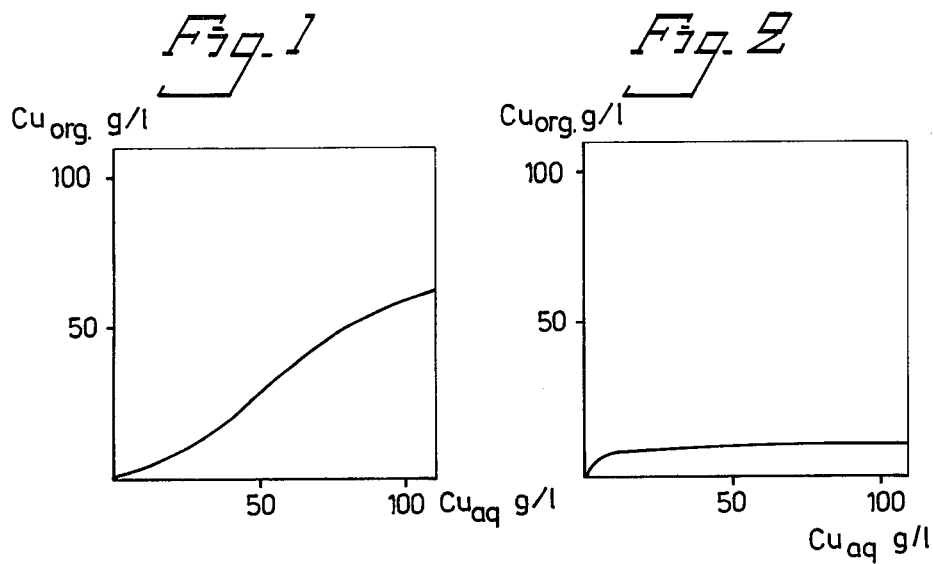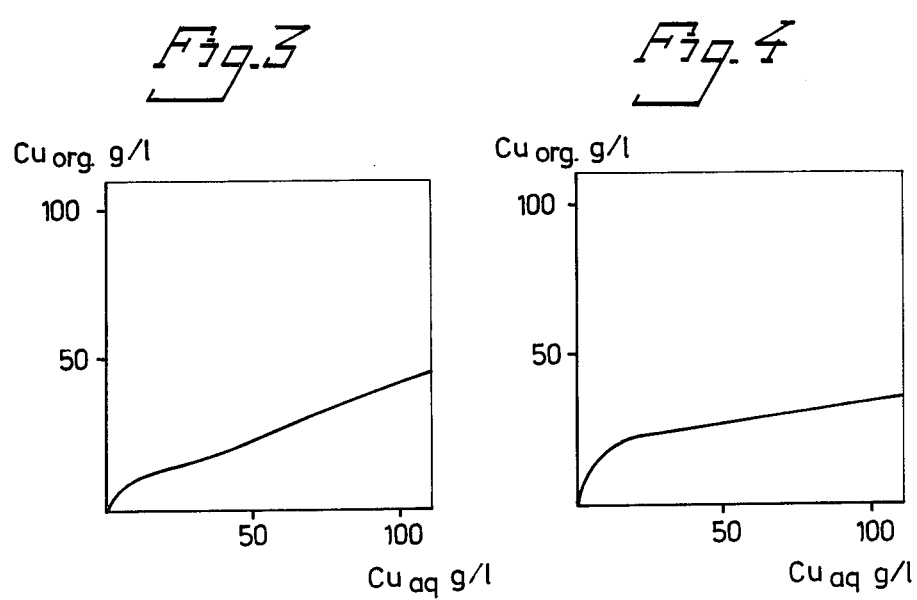

EXTRACTION OF COPPER FROM AN AMMONIACAL COPPER SOLUTION

The invention relates to a reagent and a method for the extraction of copper from an ammoniacal copper solution. The invention is particularly useful for the extraction of copper from a spent ammoniacal etching bath, e.g. an etching bath of the type disclosed in our Swedish Pat. No. 7805037-4. The invention particularly aims at recovering as much copper as possible from such an etching bath, in contrast to the process disclosed in said patent, in which it may be enough to extract a smaller portion of the copper content from the etching bath.

It is well known that copper may be extracted from acid and ammoniacal solutions by organic extraction reagents. The literature discloses, for example, the use of reagents of the type hydroxy oxime, hydroxy quinoline, and recently also alkylaryl sulfonamido quinoline, said reagents extracting copper specifically before other metals. Reagents of these groups from strong complex compounds with copper, and extract copper effectively not only from slightly acid solutions but also from ammoniacal aqueous solutions. Reagents of this group can be referred to as "strong" extraction reagents for copper.

Reagents of another group, viz. of the type beta-diketones, extract copper effectively from ammoniacal solutions. Reagents of this type are usually less specific for copper, and cannot extract copper from acid solutions. Reagents of this type form complex copper compounds which are weaker than those referred to above. Therefore, they can be referred to as "weak" extraction reagents for copper.

In an ammoniacal solution copper forms complex amine compounds according to the following chemical equilibrium:

$$Cu^{2+} + nNH_3 \rightleftharpoons Cu(NH_3)^{2+}{}_n \quad (1)$$

When copper is extracted from such an ammoniacal solution by an organic reagent HR of a type being slightly acid and cation exchanging, the chemical equilibrium for the reaction can be represented by the formula

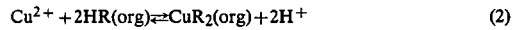

$$Cu^{2+} + 2HR(org) \rightleftharpoons CuR_2(org) + 2H^+ \quad (2)$$

The equilibrium (2) depends on the pH. At a high pH the hydrogen ion concentration in the system is low, and the equilibrium has a shift to the right (extraction). At a low pH the hydrogen ion concentration is high, and the equilibrium has a shift to the left (re-extraction). In a slightly acid aqueous solution having a given pH the equilibrium has a shift to the right for "strong" reagents, and to the left for "weak" reagents. In an ammoniacal solution the equilibrium has a shift to the right for both types of reagent.

The physical characteristics of the organic extraction solution are very important for the practical performance of a copper extraction. Therefore, it is often necessary to reduce the percentage of the reagent by diluting the solution, preferably with kerosene. Such a dilution, however, has an influence upon the copper absorbing capacity of the organic solution, meaning the maximal concentration of copper in the solution. At a high pH, when the equilibrium (2) has a heavy shift to the right, said capacity is determined, from a chemical point of view, by the percentage of reagent in the organic solution.

If a "strong" reagent is used in too high a concentration, the organic solution resulting from the extraction will have such a viscosity and density that it will be practically impossible to carry out the extraction. Also the solubility of the complex copper compound in the organic phase is a limiting factor. Therefore, for practical purposes there will exist an upper limit for the copper concentration in the organic solution, i.e. said "strong" reagent will have a comparatively low copper absorbing capacity.

The "weak" reagents referred to above possess favourable physical properties, allowing them to be used in high concentrations. The complex copper compound has a high solubility in the organic phase, thus being no limiting factor.

The "weak" reagents, but not the "strong" ones, suffer from the disadvantage that it is difficult, when extracting copper from an ammoniacal copper solution having a high copper content, to reduce the copper content to a very low value.

According to the invention the characteristics of said two types of reagent are used in an optimal way.

The invention aims at providing a method and a reagent making it possible to extract copper from highly concentrated ammoniacal copper solutions in few steps and at a low phase ratio, and to make it possible to completely recover the copper and to reduce the copper percentage of the aqueous solution to a low value. The method of the invention is characterized in contacting the ammoniacal copper solution with an organic phase containing an extraction reagent consisting of a beta-diketone, and with an organic phase containing an extraction reagent consisting of a hydroxy oxime, a hydroxy quinoline, or an alkylaryl sulphonamide quinoline. The hydroxy oxime is preferably an alpha hydroxy oxime.

One embodiment of the invention is characterized in extracting copper in a known way, in a first extraction process, from the ammoniacal solution by means of a "weak" reagent, to extract the main quantity of copper and to produce an organic solution having a high content of copper, and subsequently treating the ammoniacal solution, in a second extraction process, with a "strong" reagent, to extract the remaining quantity of copper. The main quantity of copper having been extracted in the first extraction process, the demand for a high copper content in the organic solution in the second extraction process is not so pronounced. Also, the demand for a low residual percentage of copper in the aqueous solution can be met.

The advantage of the method referred to above, as compared with the known extraction method using only a "strong" reagent or only a "weak" reagent, is that a low flow ratio is obtained in both extraction processes, and that the residual copper percentage in the aqueous solution will be low.

We prefer, however, an embodiment of the invention which results in a simplified extraction process. This embodiment is characterized in the extraction being carried out in one single extraction process, using a reagent mixture consisting of a "weak" reagent and a "strong" reagent in a suitable ratio. The reagent mixture according to the invention contains 5-30, preferably 10-15, percent by volume "strong" reagent, and 10-60, preferably 30-40, percent by volume "weak" reagent.

The reagents to be used in the invention should be, in a known way, dissolved in an organic solvent, such as kerosene. For use as "strong" reagent we prefer a commercially available extraction reagent, such as LIX 65N (an alpha-hydroxy oxime) and LIX 34 (an alkylaryl sulphonamide quinoline) produced by Henkel Corp., USA, and SME 529 (an alpha-hydroxy oxime), produced by Shells Chemicals, Holland. For use as "weak" reagent we prefer LIX 54 (a beta-diketone) from Henkel Corp. and DK 16 (a beta-diketone) from Hoechst AG, Federal Republic of Germany. These reagents contain, as sold, an organic solvent. The content of active reagent is 40–70 percent by volume. It may be necessary to add additional solvent, to give the reagent suitable physical properties when it has a high load of copper. In a "strong" reagent solution the content of active reagent is suitably 5–40, preferably 10–20, percent of volume. In a "weak" reagent solution the content of active reagent is suitably 20–80, preferably 40–60, percent by volume.

BRIEF DESCRIPTION OF THE DRAWINGS

The invention will now be described with reference to the equilibrium diagrams illustrated on the drawing. The diagrams illustrate the distribution, at equilibrium, of copper between an ammoniacal aqueous solution and an organic extraction solution. The abscissa represents the copper content $Cu_{aq}$ in grams per liter in the aqueous solution, and the ordinate represents the copper content $Cu_{org}$ in grams per liter in the organic solution.

FIG. 1 shows a typical diagram for a "weak" reagent such as LIX 54 or DK 16.

FIG. 2 shows a typical diagram for a "strong" reagent, such as SME 529, LIX 65N or LIX 34. The percentages of reagent have been chosen so that the physical properties of the two organic solutions, after copper extraction, have been approximately equal, viz. 60 percent by volume, dissolved in kerosene, in FIG. 1, and 12 percent by volume, dissolved in kerosene, in FIG. 2.

FIGS. 3 and 4 illustrate the distribution of copper at equilibrium for two mixtures of reagents according to the invention.

For a "weak" reagent according to FIG. 1 a high copper content in the aqueous solution results in a high copper content in the organic solution. The ratio $Cu_{org}/Cu_{aq}$ is favourable. A low copper content in the aqueous solution results in a comparatively lower copper content in the organic solution. The ratio $Cu_{org}/Cu_{aq}$ is unfavourable. This means that a practical process, to result in a low copper content in the aqueous solution leaving the extraction process, must operate with an exceptionally large flow ratio org/aq. This is so because of the curvature of the extraction diagram for low copper contents. The high capacity of the reagent at high copper contents cannot be utilized, not even if the aqueous solution entering the extraction process has a high copper content. The extraction has to be carried out at an unfavourable phase ratio and with a large number of extraction steps.

For a "strong" reagent, as illustrated in FIG. 2 the copper content of the organic solution is limited and does not increase as a result of an increasing copper content in the aqueous solution. Consequently, the ratio $Cu_{org}/Cu_{aq}$ is low at high copper contents, and is very high at low copper contents. The extraction has to take place at a very unfavourable phase ratio.

FIG. 3 relates to a mixture of reagents according to the invention, containing 35 percent by volume "weak" reagent (LIX 54), 10 percent by weight "strong" reagent (LIX 65N), and 55 percent by volume kerosene. FIG. 4 relates to another mixture of reagents according to the invention, containing 12 percent by volume "weak" reagent (DK 16), 20 percent by volume "strong" reagent (SME 529), and 68 percent by volume kerosene. The commercial products used for preparing said solutions contain 40–70 percent by volume of the active substance, dissolved in kerosene. They were diluted, when required, with an additional quantity of kerosene, so as to reach the percentages referred to. As is evident from FIGS. 3 and 4 it is possible to obtain a high copper content in the organic solution, while maintaining a good extraction capacity at very low copper contents. Consequently, it is possible to recover practically the entire copper quantity from the aqueous solution by means of a few extraction steps and a flow ratio which is useful for practical operation.

The method of the invention can be carried out in various ways, using available knowledge in the art of liquid-liquid extraction. The extraction and the re-extraction may be carried out in one or more steps as a counter-current operation using known principles and equipments. In one embodiment a washing step may be inserted between the extraction and the re-extraction, for removing ammonia having accompanied the organic solution by means of, for example, a hydrochloric acid solution. Copper may be re-extracted by means of an acid aqueous solution, preferably containing sulphuric acid or hydrochloric acid having a concentration of 1–5 M, preferably 1–3 M. We prefer a sulphuric acid solution if copper metal is to be recovered by electrolysis.

EXAMPLE 1

A spent etching solution contained 120 g/l Cu, 4 moles per liter free $NH_3$, and 4 moles per liter $NH_4Cl$. The solution was treated in a first extraction process comprising two mixer-settler steps, using an extraction solution containing 50 percent by volume "weak" reagent (LIX 54) and 50 percent by volume kerosene. The flow rate of the aqueous solution was 0.12 l/min, and that of the organic solution was 0.28 l/min. The copper content of the aqueous solution leaving the first extraction process was 49 g/l. The copper content of the organic solution was 30.5 g/l.

The aqueous solution was now treated in a second extraction process comprising two mixer-settler steps, using an extraction solution containing 12 percent by volume "strong" reagent (LIX 65N). The flow rate of the aqueous solution was 0.12 l/min, and that of the organic solution was 0.90 l/min. The copper content of the aqueous solution leaving the second extraction process was 6.5 g/l.

The organic solution from the second extraction process was contacted with 2 M sulphuric acid in a re-extraction process comprising one mixer-settler step. The flow rate of the sulphuric acid was 0.3 l/min. The copper content of the sulphuric acid solution leaving the re-extraction process was 19 g/l. The copper content of the organic solution was 0.5 g/l. The organic solution from the first extraction process was treated in the same way with the sulphuric acid solution previously used, in a re-extraction process comprising one mixer-settler step. The copper content of the sulphuric acid solution leaving said re-extraction process was 47 g/l. The copper content of the organic solution was less than 0.1 g/l.

As a comparison to illustrate the result of using a "weak" reagent only, a spent etching solution as described above was treated, in an extraction process comprising four mixer-settler steps, with an extraction solution containing 50 percent by volume "weak" reagent (LIX 54) and 50 percent by volume kerosene. The flow rate of the aqueous solution was 0.15 l/min, and that of the organic solution was 1.6 l/min. The copper content of the aqueous solution leaving the extraction process was 12 g/l. The copper content of the organic solution was 14 g/l.

Copper could be re-extracted from the organic solution by contacting said solution with an aqueous solution of sulphuric acid.

The comparative example shows that it is not possible to obtain a low residual percentage of copper in the aqueous solution, not even with a comparatively high flow ratio and many extraction steps.

In another comparative example to illustrate the result of using a "strong" reagent only, a spent etching solution as described above was treated, in an extraction process comprising two mixer-settler steps, with an extraction solution containing 12 percent by volume "strong" reagent (LIX 65N) and 88 percent by volume kerosene. The flow rate of the aqueous solution was 0.12 l/min, and that of the organic solution was 2.2 l/min. The copper content of the aqueous solution leaving the extraction process was 1.7 g/l, and that of the organic solution was 6.4 g/l.

Copper could be re-extracted from the organic solution by contacting said solution with an aqueous solution of sulphuric acid.

The comparative example shows that it is possible to obtain a comparatively low residual content of copper in the aqueous solution when using a "strong" reagent only, but only when using an extremely high flow ratio.

EXAMPLE 2

Various mixtures of "weak" and "strong" reagents were examined in a mixer-settler apparatus, using three or four extraction steps. The aqueous solution was a spent etching solution containing 150 g/l Cu, 5 moles per liter free $NH_3$, and 5 moles per liter $NH_4Cl$. The solution was conveyed through the mixer-settler apparatus while being treated with an organic solution consisting of a mixture of reagents dissolved in kerosene. A plurality of experiments were made with various mixtures of reagents. The experimental conditions are listed in the Table.

All the experiments disclose that it is possible to obtain, with comparatively few extractions steps, a high percentage of copper in the organic solution when using a comparatively low flow rate, while reducing the percentage of copper in the aqueous solution to a low value.

Copper could be re-extracted from all organic solutions by means of an aqueous solution of sulphuric acid.

|  | Experiment No. | | | | | |
|---|---|---|---|---|---|---|
|  | 1 | 2 | 3 | 4 | 5 | 6 |
| Number of mixer-settler steps | 3 | 3 | 3 | 3 | 4 | 4 |
| Composition of organic solution | | | | | | |
| percent by volume of "weak" reagent | 35 | 40 | 12 | 35 | 35 | 35 |
| type of "weak" reagent | DK16 | LIX54 | DK16 | DK16 | DK16 | LIX54 |
| percent by volume of "strong" reagent | 15 | 10 | 20 | 12 | 15 | 12 |
| type of "strong" reagent | SME 529 | SME 529 | SME 529 | LIX 65N | LIX 34 | LIX 65N |
| kerosene, percent by volume | 50 | 50 | 68 | 53 | 50 | 53 |
| Aqueous solution | | | | | | |
| flow rate, l/min | 0.13 | 0.13 | 0.10 | 0.13 | 0.12 | 0.11 |
| copper content of entering solution, g/l | 150 | 150 | 150 | 150 | 150 | 150 |
| copper content of leaving solution, g/l | 0.95 | 1.5 | 0.4 | 2.5 | 0.3 | 0.4 |
| Organic solution | | | | | | |
| flow rate, l/min | 0.70 | 0.77 | 0.60 | 0.57 | 0.56 | 0.62 |
| copper content of entering solution, g/l | 0 | 0 | 0 | 0 | 0 | 0 |
| copper content of leaving solution g/l | 28 | 25 | 30 | 26 | 32 | 24 |

LIX 34 - alkylaryl sulphonamide quinoline - Henkel Corp., USA
LIX 54 - beta-diketone - Henkel Corp., USA
LIX 65N - alpha-hydroxy oxime - Henkel Corp., USA
DK 16 - beta-diketone - Hoechst AG, Fed. Rep. of Germany
SME 529 - alpha-hydroxy oxime - Shell Chemicals, Holland.

We claim:

1. A method for the extraction of copper from an ammoniacal copper solution, comprising contacting the ammoniacal copper solution, in a first extraction process, with an organic phase containing an extraction reagent consisting of a beta-diketone, and subsequently contacting the ammoniacal copper solution, in a second extraction process, with an organic phase containing an extraction reagent consisting of a hydroxy oxime, a hydroxy quinoline, or an alkylaryl sulphonamide quinoline.

2. A method as claimed in claim 1, characterized in re-extracting copper from the two organic phases by first contacting an aqueous solution of an acid with the copper-containing organic phase from the second extraction process, and subsequently contacting said aqueous solution with the copper-containing organic phase from the first extraction process.

3. A method for the extraction of copper from an ammoniacal copper solution, comprising contacting the ammoniacal copper solution with an organic phase containing an extraction reagent consisting of a beta-ketone and an extraction reagent consisting of a hydroxy oxime, a hydroxy quinoline, or an alkylaryl sulphonamido quinoline.

* * * * *